(12) United States Patent
Halsey et al.

(10) Patent No.: US 11,718,520 B2
(45) Date of Patent: *Aug. 8, 2023

(54) SOLID HYDROGEN STORAGE SYSTEM

(71) Applicant: GE AVIATION SYSTEMS LIMITED, Cheltenham (GB)

(72) Inventors: Colin John Halsey, Tewkesbury (GB); Alexander James Rainbow, Swindon (GB)

(73) Assignee: GE Aviation Systems Limited, Cheltenham (GB)

(*) Notice: Subject to any disclaimer, the term of this patent is extended or adjusted under 35 U.S.C. 154(b) by 212 days.

This patent is subject to a terminal disclaimer.

(21) Appl. No.: 17/161,081

(22) Filed: Jan. 28, 2021

(65) Prior Publication Data
US 2021/0155477 A1 May 27, 2021

Related U.S. Application Data

(63) Continuation of application No. 15/744,892, filed as application No. PCT/EP2015/069166 on Aug. 20, 2015, now Pat. No. 10,934,165.

(51) Int. Cl.
| | |
|---|---|
| *H01M 8/0612* | (2016.01) |
| *H01M 8/065* | (2016.01) |
| *H01M 8/0606* | (2016.01) |
| *C01B 3/06* | (2006.01) |
| *C01B 3/00* | (2006.01) |
| *C01B 3/04* | (2006.01) |
| *B64D 41/00* | (2006.01) |

(52) U.S. Cl.
CPC ............. *C01B 3/065* (2013.01); *C01B 3/001* (2013.01); *C01B 3/0005* (2013.01); *C01B 3/04* (2013.01); *C01B 3/06* (2013.01); *H01M 8/065* (2013.01); *H01M 8/0643* (2013.01); *B64D 2041/005* (2013.01); *H01M 2250/20* (2013.01); *Y02E 60/32* (2013.01); *Y02E 60/36* (2013.01); *Y02T 90/40* (2013.01)

(58) Field of Classification Search
CPC ....... C01B 3/065; C01B 3/0005; C01B 3/001; C01B 3/04; C01B 3/06; H01M 8/0643; H01M 8/065; H01M 2250/20; H01M 8/0606; B64D 2041/005; Y02E 60/32; Y02E 60/36; Y02E 60/50; Y02T 90/40
See application file for complete search history.

(56) References Cited

U.S. PATENT DOCUMENTS

| | | |
|---|---|---|
| 8,636,834 B2 | 1/2014 | Fruchart et al. |
| 10,934,165 B2 * | 3/2021 | Halsey ................. H01M 8/065 |
| 2002/0006365 A1 | 1/2002 | Suzuki et al. |

(Continued)

FOREIGN PATENT DOCUMENTS

| | | | |
|---|---|---|---|
| CN | 1419959 | * | 5/2003 |
| CN | 104487757 A | | 4/2015 |

(Continued)

*Primary Examiner* — Lisa S Park
(74) *Attorney, Agent, or Firm* — McGarry Bair PC

(57) ABSTRACT

A hydrogen storage system includes a pressure-sealed sleeve defining an interior and having an outlet, a shaft extending through the interior of the sleeve, a set of porous chambers arranged axially along and concentric to the shaft, and a hydrogen storage, wherein at least some hydrogen gas is supplied to the outlet.

19 Claims, 5 Drawing Sheets

(56) References Cited

U.S. PATENT DOCUMENTS

| | | | |
|---|---|---|---|
| 2003/0091503 A1* | 5/2003 | Rosenfeld | B60L 53/51 |
| | | | 423/657 |
| 2005/0175868 A1 | 8/2005 | McClaine et al. | |
| 2005/0211573 A1 | 9/2005 | Myasnikov et al. | |
| 2009/0107853 A1 | 4/2009 | Tan et al. | |
| 2010/0236767 A1 | 9/2010 | Toh et al. | |
| 2012/0138172 A1 | 6/2012 | Curello et al. | |
| 2012/0160711 A1 | 6/2012 | Yang et al. | |
| 2013/0172640 A1 | 7/2013 | Robinson et al. | |
| 2015/0064585 A1* | 3/2015 | Hyde | F02M 21/0221 |
| | | | 123/3 |
| 2015/0217869 A1 | 8/2015 | Brunaux et al. | |

FOREIGN PATENT DOCUMENTS

| | | |
|---|---|---|
| CN | 104852067 A | 8/2015 |
| GB | 2522865 A1 | 8/2015 |

* cited by examiner

SOLID HYDROGEN STORAGE SYSTEM

CROSS REFERENCE TO RELATED APPLICATION

The present application is a continuation of U.S. patent application Ser. No. 15/744,892, filed Jan. 15, 2018, now U.S. Pat. No. 10,934,165, issued Mar. 2, 2021, which is a National Phase application of International Patent Application No. PCT/EP2015/069166 filed on Aug. 20, 2015, all of which are incorporated herein by reference in their entirety.

BACKGROUND OF THE INVENTION

Hydrogen can be a fuel for creating consumable energy by way of combustion in an engine or conversion from chemical energy into electrical energy through a chemical reaction, such as in a fuel cell. In the aforementioned examples, the hydrogen fuel is typically supplied in gaseous form. In order to generate consumable energy for an extended period of time in such systems, a large amount of hydrogen gas, and thus a large amount of potential energy, can be stored for consumption.

Energy storage systems for hydrogen can include gaseous storage tanks and can be configured to hold hydrogen gas at high pressures near 700 bar in order to store hydrogen in adequate quantities for particular energy consumption needs. High pressure energy storage systems, such as those storing hydrogen gases at pressures near 700 bar, must include more robust components designed to handle or account for such high pressures. Additionally, since hydrogen gas is combustible, any rupture, breach, or failure of a gaseous storage tank or supporting pressure system holding high pressure hydrogen gas includes expose the surrounding area to serious safety risks and danger.

BRIEF DESCRIPTION OF THE INVENTION

In one aspect, a solid hydrogen storage system, comprising a pressure-sealed sleeve defining an interior and having an outlet, a shaft extending through the interior of the pressure-sealed sleeve, a set of porous chambers arranged axially along and concentric to the shaft and wherein at least one of the set of porous chambers includes a porous basket and a porous lid, and a hydrogen storage solid held by the at least one of the set of porous chambers and wherein hydrogen gas liberated from the hydrogen storage solid due to a chemical reaction flows from the at least one of the set of porous chambers and is supplied to the outlet.

DESCRIPTION OF EMBODIMENTS OF THE INVENTION

Embodiments of the invention can be implemented in any environment using hydrogen as a fuel for creating consumable energy, for example, by way of combustion in an engine or conversion from chemical energy into electrical energy through a chemical reaction. While this description is primarily directed toward a hydrogen storage system to provide hydrogen gases for conversion into electrical energy to power electrical systems for an aircraft, embodiments of the disclosure are applicable to any creation of consumable energy by providing hydrogen gas for energy generation. Additionally, while this description is directed toward an emergency power generation system in an aircraft, embodiments of the disclosure can be further applicable to provide hydrogen gases to generate stand-alone or supplemental electrical power in otherwise non-emergency operations, such as takeoff, landing, or cruise flight operations.

Figure 1:
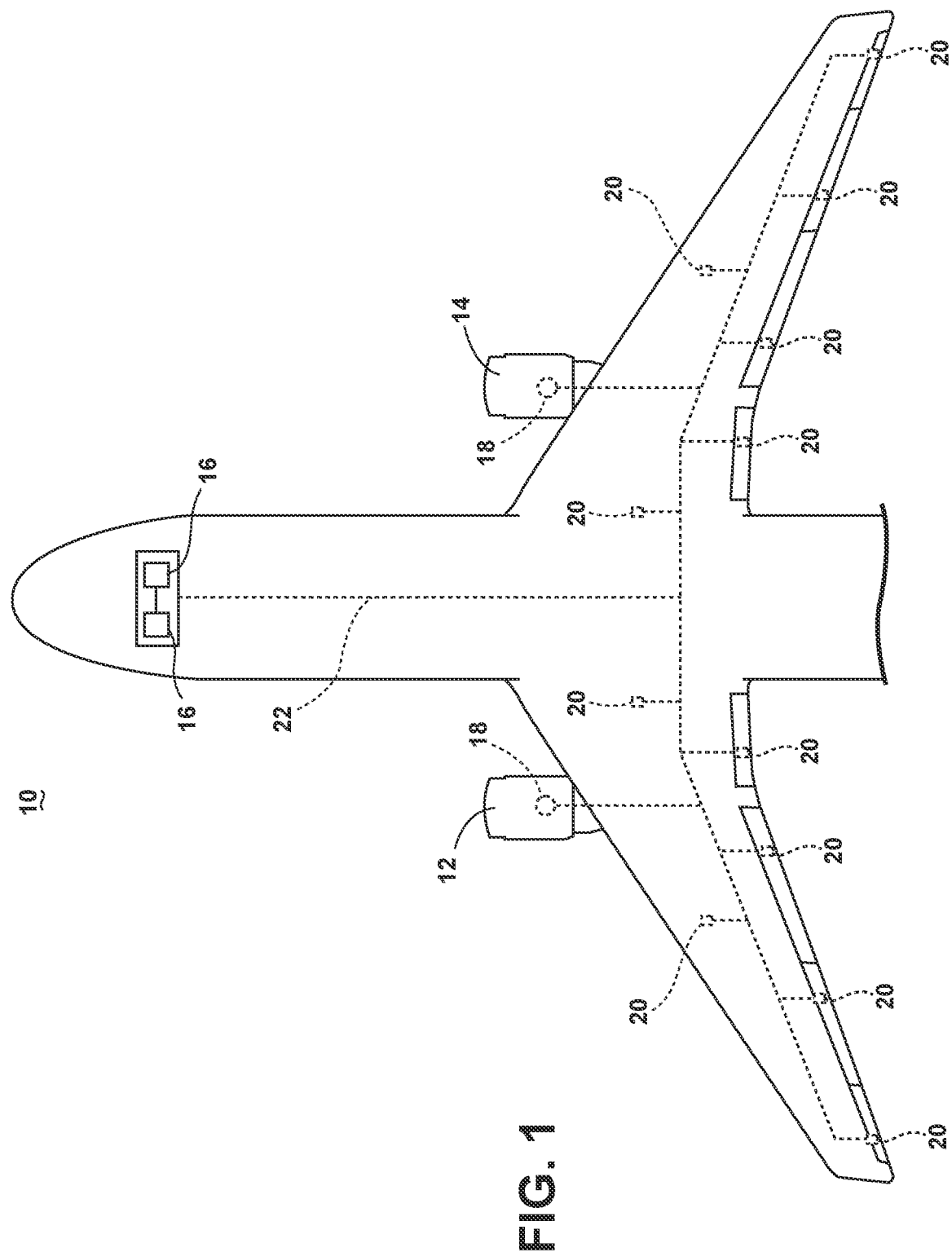
FIG. 1 illustrates a top down schematic view of an aircraft and power distribution system, in accordance with various aspects described herein.

As illustrated in FIG. 1, an aircraft 10 is shown having at least one gas turbine engine, shown as a left engine system 12 and a right engine system 14. Alternatively, the power system may have fewer or additional engine systems. The left and right engine systems 12, 14 may be substantially identical, and may further comprise at least one electric machine, such as a generator 18. The aircraft is shown further comprising a plurality of power-consuming components, or electrical loads 20, for instance, an actuator load, flight critical loads, and non-flight critical loads. Each of the electrical loads 20 are electrically coupled with at least one of the generators 18 via a power distribution system, for instance, bus bars 22. In the aircraft 10, the operating left and right engine systems 12, 14 provide mechanical energy which may be extracted via a spool, to provide a driving force for the generator 18. The generator 18, in turn, provides the generated power to the bus bars 22, which delivers the power to the electrical loads 20 for load operations.

The aircraft 10 or power system can include additional power sources for providing power to the electrical loads 20, and can include emergency power sources 16, ram air turbine systems, starter/generators, batteries, super capacitors, or the like. The depiction of the aircraft 10, emergency power sources 16, engines 12, 14, generators 18, electrical loads 20, and bus bars 22 are provided merely as one non-limiting example schematic aircraft 10 configuration, and is not intended to limit embodiments of the disclosure to any particular aircraft 10 or operating environment. It will be understood that while one embodiment of the invention is shown in an aircraft environment, the embodiments of the invention are not so limited and has general application to electrical power systems in non-aircraft applications, such as other mobile applications and non-mobile industrial, commercial, and residential applications.

Additionally, while various components have been illustrated with relative position of the aircraft (e.g. the emergency power sources 16 near the head or cockpit of the aircraft 10), embodiments of the disclosure are not so limited, and the components are not so limited based on their schematic depictions. For example, the emergency power sources 16 can be located in an aircraft 10 wing, a tail section, or farther toward the rear of the aircraft fuselage. Addition aircraft configurations are envisioned.

Figure 2:
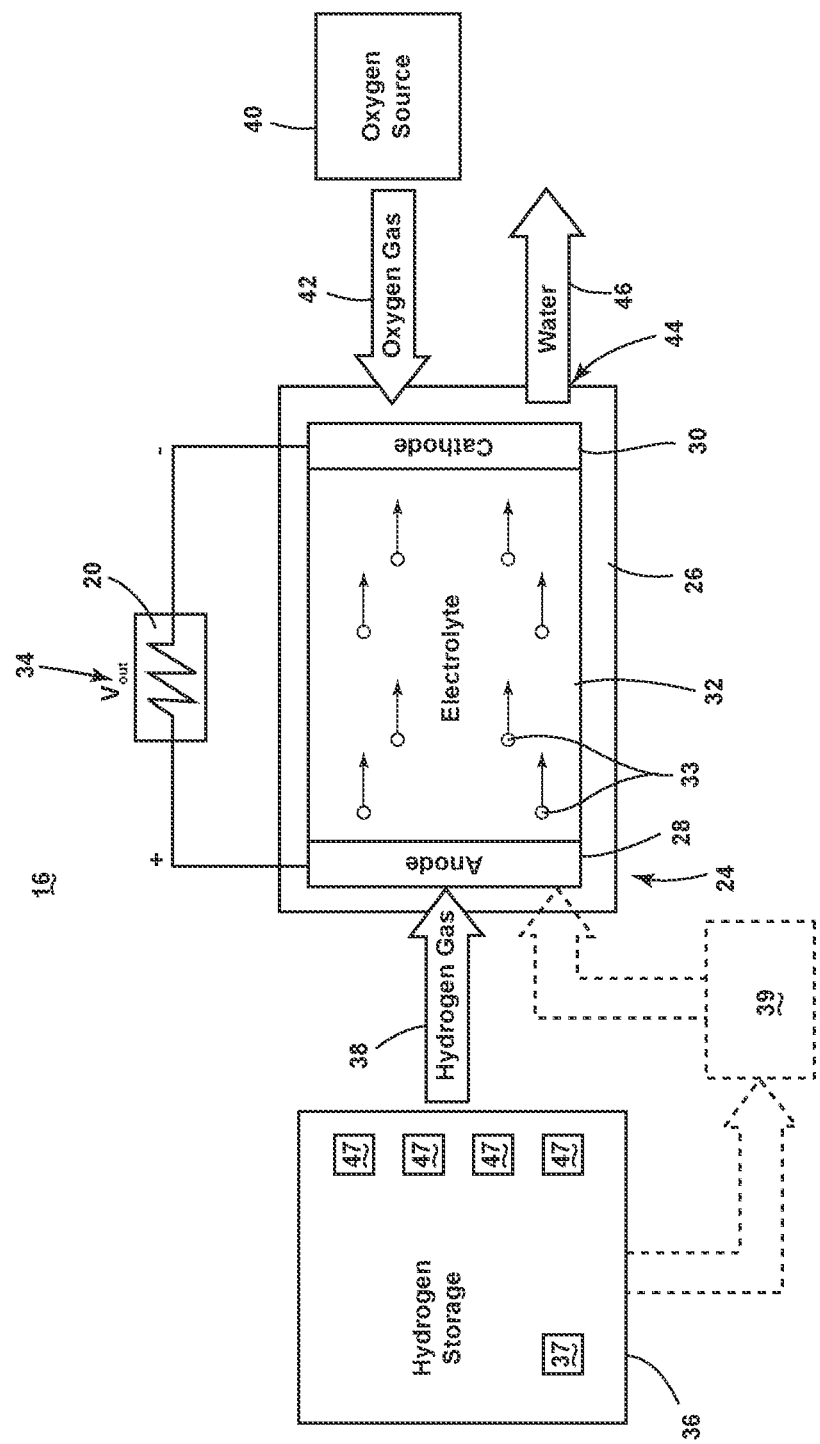
FIG. 2 illustrates a schematic view of the operation of a fuel cell, in accordance with various aspects described herein.

FIG. 2 illustrates an example configuration of operation of an emergency power source 16, shown as a fuel cell system 24, accordance with various aspects described herein. The fuel cell system 24 includes a fuel cell 26 including an anode 28 (positive side of the fuel cell 26) and cathode 30 (negative side of the fuel cell 26) separated by an electrolyte 32 that allows positively charged hydrogen ions 33 to move between the anode 28 and cathode 30. The fuel cell 26 can include a voltage output 34 electrically coupled with the anode 28 and cathode 30 to provide current or electrical power generated between the anode 28 and cathode 30. The voltage output 34 can, for example, power one or more electrical loads 20, illustrated by a representative single load 20.

The fuel cell system 24 additionally includes a hydrogen storage system 36 including a set of hydrogen storage units 47 in communication with the anode 28 of the fuel cell 26 such that the hydrogen storage system 36 can provide hydrogen gas 38 to the anode 28. Each of the hydrogen storage units 47 can be configured to provide the hydrogen gas 38 independently of, or simultaneous with, other units 47, as designed base on the hydrogen gas 38 needs or demands of the fuel cell system 24. The hydrogen storage system 36 can optionally include a controller module 37 configured to control the operation of the storage system 36 or the operation of the set of hydrogen storage units 47, which will be further explained below. The fuel cell system 24 can further include an oxygen source 40 configured to provide oxygen gas 42 to the cathode 30 of the fuel cell 26, and a water outlet 44 for removing water 46 from the cathode 30 of the fuel cell 26.

The fuel cell system 24 can optionally include an intermediary hydrogen gas storage unit 39, illustrated in dotted outline, configured to store the hydrogen gas 38 or excess hydrogen gas 38 that has been provided by the hydrogen storage system 36 or hydrogen storage units 47. One non-limiting example of an intermediary hydrogen gas storage unit 39 can include a pressurized storage tank.

The anode 28 or cathode 30 can further include one or more catalysts that cause, encourage, or promote the hydrogen gas 38 to undergo oxidation reactions to generate the hydrogen ions 33 and electrons. The ions 33 can then traverse the electrolyte 32, while the electrons are drawn to the voltage output 34 or electrical load 20. In this sense, the fuel cell 26 can generate direct current (DC). At the cathode 30, the hydrogen ions 33, the electrons, and oxygen gas 42 form the water 46 which is removed from the fuel cell 26 by way of the water outlet 44.

The anode 28 and cathode 30 can be selected from various conductive materials having a potential difference and configured to produce the above-described chemical reactions. Particular anode 28 or cathode 30 materials are not germane to embodiments of the invention. Additionally, the electrolyte 32 can be selected from various electrolytic materials configured for fuel cell 26 operations, including, but not limited to proton exchange membrane-type fuel cells (PEM fuel cells, or PEMFC) or solid oxide-type fuel cells. Additionally, while the fuel cell 26 is schematically illustrated as a single "cell" having one anode 28, one cathode 30, and one electrolyte 32, embodiments of the disclosure are envisioned wherein individual cells are "stacked," or placed in series, to create a desired voltage output 34 configured to meet a particular operating requirement. For example, an emergency power source 16 can be required to deliver DC power at 270V. Additional or alternative power operating requirements are envisioned wherein, for example, multiple stacked fuel cells 26 can be configured in parallel to provide additional current. Moreover, while the illustrated embodiment describes a DC voltage fuel cell system 24, embodiments of the disclosure are equally applicable with fuel cell systems 24 configured to provide an alternating current (AC) voltage output, for example, by way of an inverter system (not shown).

Figure 3:
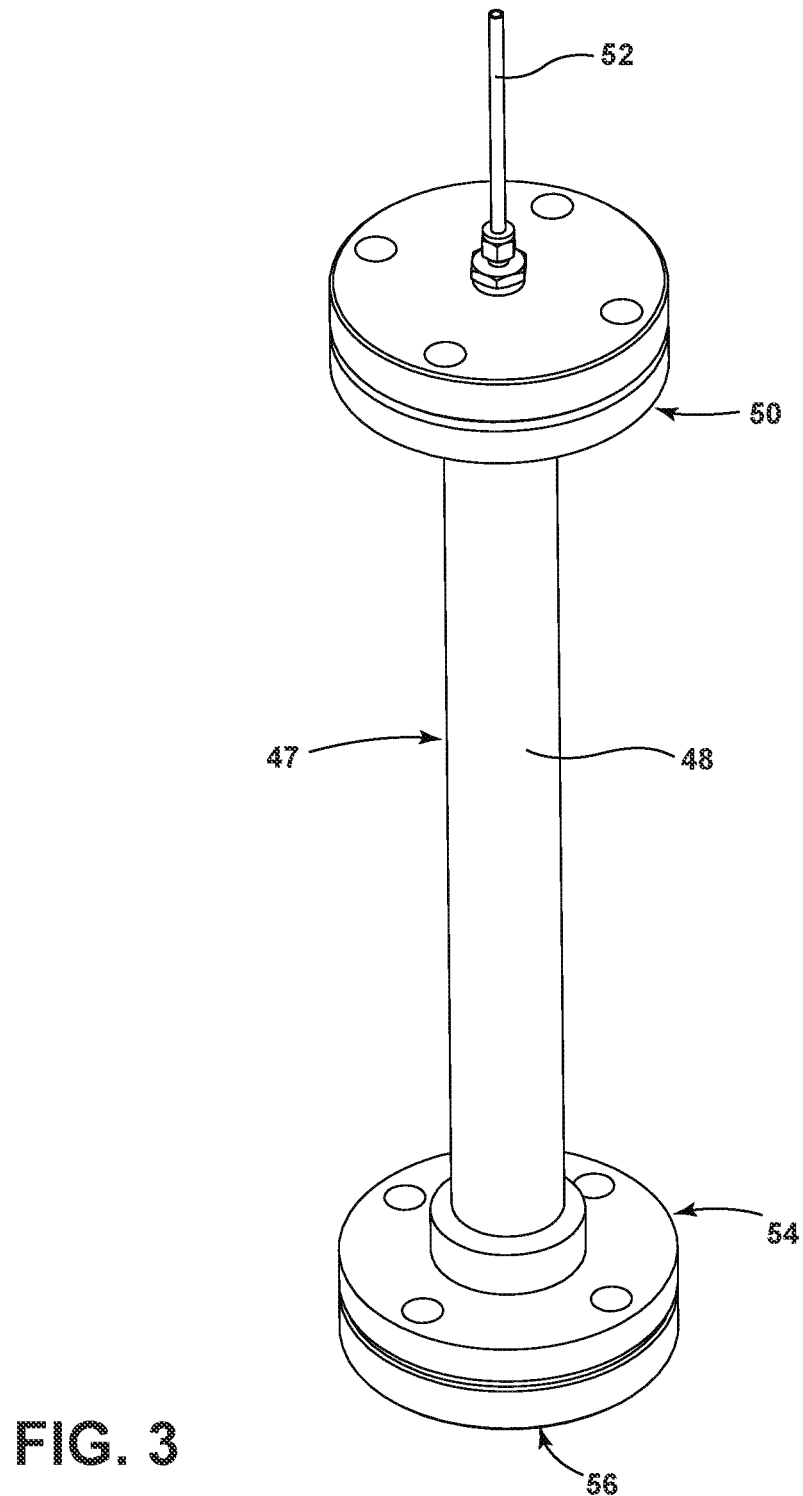
FIG. 3 illustrates a perspective view of a solid hydrogen storage system, in accordance with various aspects described herein.
Figure 4:
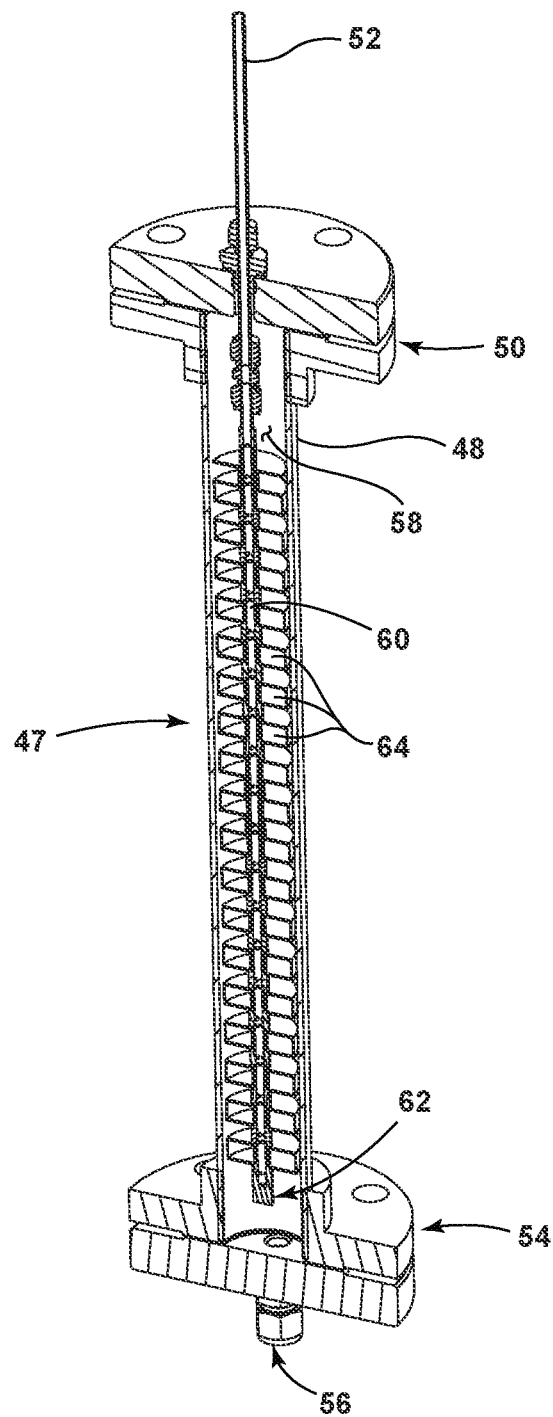
FIG. 4 illustrates a cross-sectional view of the sold hydrogen storage system of FIG. 3, in accordance with various aspects described herein.

FIG. 3 illustrates an example hydrogen storage unit 47 for the hydrogen storage system 36 having a pressure-sealed sleeve 48 terminating with a first end 50 having an inlet 52 and an opposing second end 54 having a gas outlet 56 (further shown in FIG. 4). The first end 50 and second end 54 can include, for instance, pressure-sealing configurations and mountings configured for mounting the hydrogen storage unit 47 within the hydrogen storage system 36. While the hydrogen storage unit 47 is shown upright with the inlet 52 at the top of the unit 47 and the gas outlet 56 is at the bottom of the unit 47, the illustrated depiction does not limit the orientation of the hydrogen storage unit 47 as it is stored in the hydrogen storage system 36.

FIG. 4 illustrates a cross-sectional view of the hydrogen storage unit 47 of FIG. 3. As shown, the pressure-sealed sleeve 48 defines an interior 58 having a shaft 60 fluidly coupled with the inlet 52 and extending through the interior 58 of the sleeve 48 and terminating at a sealed distal end 62 proximate to the gas outlet 56. The shaft 60 can include a hollow cavity running axially through the shaft 60, and can further support a set of serially configured or axially aligned porous chambers 64 positioned along the length of the shaft 60. As illustrated, the set of porous chambers 64 can be circularly shaped and concentric to the shaft 60, with the shaft 60 extending through the individual chambers 64.

The inlet 52 can be fluidly coupled with a water or steam reservoir (not shown) and configured to deliver water or steam to the interior 58 of the pressure-sealed sleeve 48, for instance, by way of the shaft 60. The water or steam can be dispersed within the interior 58 of the sleeve 48 and ultimately reach or interact with the set of porous chambers 64. Alternatively, the inlet 52 can be thermally coupled with a heat source (not shown) and configured to deliver heat, for example, through a thermal interface such as a thermally conductive material, the walls of the inlet 52 or shaft 60, or a heat pipe. The heat can be thermally dispersed within the interior 58 of the sleeve 48, and likewise, ultimately reach or interact with the set of porous chambers 64.

The set of porous chambers 64 can be manufactured or configured to include at least one wall having a porous interface to provide for permeation of, for example, water, steam, or hydrogen gases through the wall. Thus, in one example configuration explained above, when water or steam is dispersed within the interior 58 of the sleeve 48 by way of the inlet 52 or shaft 60, the water or steam can permeate the set of porous chambers 64 such that the water or steam can reach the interior of the chambers 64.

The set of porous chambers 64 can further be manufactured from or configured to include at least one thermally conductive wall to provide for thermal conduction of heat through the wall. In another example configuration explained above, when heat is delivered, for example through a thermal interface, the heat can be conducted by way of the at least one thermally conductive wall to transfer the heat to the interior of the set of porous chambers 64. For example, if heat is delivered to the interior 58 of the sleeve 48 through a heat pipe located in the shaft 60, the set of porous chambers 64 can be configured to conduct heat received from the heat pipe, through the shaft 60, and through an inner concentric wall of the chambers 64, to the interior of the chambers 64, where it can radiate through the chamber 64. Alternatively, heat located in or delivered to the interior 58 of the sleeve 48 can be received into the interior of the set of porous chambers 64 by way of a thermally conductive wall located away from shaft 60, such as through an outer concentric wall, a top wall, or a bottom wall of the chambers 64.

The gas outlet 56 can include a port configured to deliver hydrogen gas located in the interior 58 of the sleeve 48 to a fluidly coupled destination, such as the intermediary hydrogen gas storage unit 39 or the fuel cell 26. Embodiments of the gas outlet 56 can be further configured such that only hydrogen gases are allowed pass through the outlet 56. For example, the gas outlet can include a gas-permeable membrane or the like configured to allow hydrogen gases to permeate the membrane. In this sense, other materials that can be located in the interior 58 of the sleeve 48, including, but not limited to steam or water, will be prevented from passing through the gas outlet 56.

Figure 5:
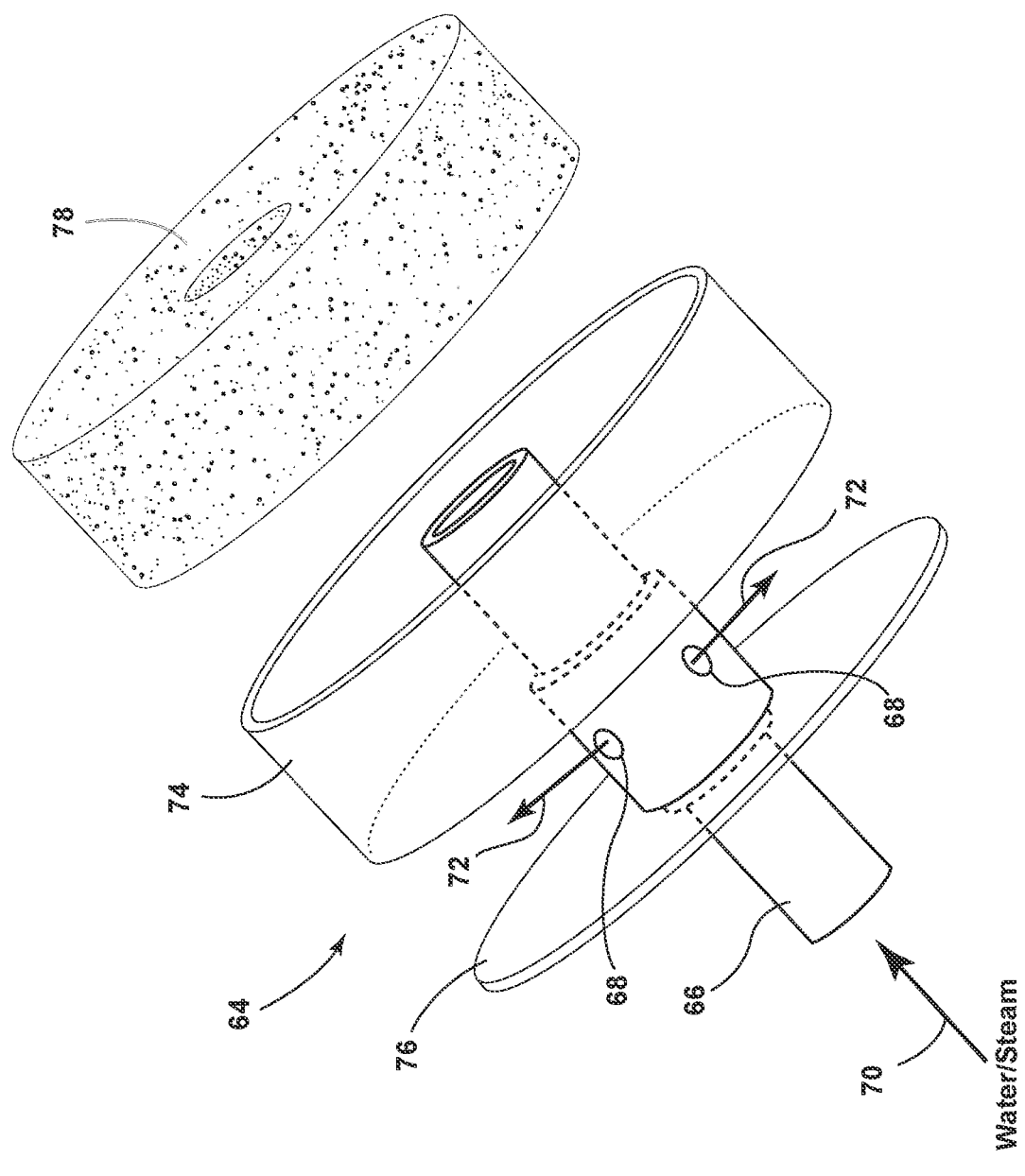
FIG. 5 illustrates a perspective view of the hydrogen storage solid and porous chamber of FIG. 4, in accordance with various aspects described herein.

FIG. 5 illustrates a detailed view of one example porous chamber 64 in accordance with various aspects described herein. As shown, the shaft 60 can include a set of shaft segments 66 configured to axially align with, and couple to, adjacent shaft segments 66. The set of shaft segments 66 can further include a set of radially or axially spaced ports 68 or apertures that provide access to the shaft 60 interior or shaft segment 66 interior. In this sense, water or steam (represented by arrow 70) provided to the shaft 60 or set of shaft segments 66 can be dispersed (represented by arrows 72) within the interior 58 of the sleeve 48 through the set of ports 68.

The shaft segment 66 can include or support the one or more porous chambers 64, wherein the chamber 64 further includes a porous basket 74 and a porous lid 76. In the embodiment of the shaft segment 66 illustrated, the porous basket 74 and porous lid 76 are fixedly separated along an axial length of the segment 66. In this sense, the shaft segment 66, porous chamber 64, or porous basket 74 and porous lid 76 can be configured such that when adjacent shaft segments 66 are assembled, the lid 76 from a first shaft segment 66 can be coupled mated with a basket from the second adjoining shaft segment 66.

Alternatively, embodiments of the porous chamber 64 are envisioned wherein at least one of the porous basket 74 or porous lid 76 can be movable, and wherein the basket 74 and lid 76 on a single shaft segment 66 can couple or mate to form a complete porous chamber 64. Additionally, the porous basket 74 and porous lid 76 can be keyed to couple in one or more known or expected designs or orientations. In yet another additional configuration, at least one of the porous chamber 64, porous basket 74, or porous lid 76 can be configured to mate or couple in such a manner as to provide for a known or expected deformation, for example, in response to an expansion of a material held by the chamber 64, basket 74, or lid 76, such as in a chemical reaction.

The porous chamber 64 is configured to hold or retain a hydrogen storage solid 78 material. As used herein, a hydrogen storage solid 78 material can include a chemical composition including hydrogen molecules, wherein the composition is in a solid state or solid form. Non-limiting examples of hydrogen storage solids 78 can include metal hydrides, such as lithium hydride (LiH), or hydroxides mixed with metal hydrides, such as lithium hydroxide (LiOH), which can be produced, developed, or included in the porous chamber 64 as a powder, or pressed-powder "cake." Additional hydrogen storage solid 78 materials in additional solid state forms are envisioned.

Embodiments of the hydrogen storage unit 47 operate by freeing, releasing or otherwise liberating hydrogen gases stored in the hydrogen storage solid 78, for instance by way of a chemical reaction, and delivering the liberated hydrogen gases to the fuel cell 26 via the gas outlet 56 (see FIG. 4). In a first example embodiment, water or steam can be supplied via the inlet 52 and through a hollow cavity of the shaft 60, wherein the water or steam is released into the interior 58 of the pressure-sealed sleeve 48 by way of the set of ports 68. The water or steam can then permeate the set of porous chambers 64, wherein the water or steam can chemically react with the hydrogen storage solid 78. For instance, in embodiments wherein the hydrogen storage solid 78 is lithium hydride, the chemical reaction releases hydrogen gas and lithium hydroxide, as follows:

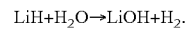

$$\mathrm{LiH} + \mathrm{H_2O} \rightarrow \mathrm{LiOH} + \mathrm{H_2}.$$

The hydrogen gases can be delivered to the fuel cell 26, to generate power for the emergency power source 16, as explained herein.

The amount of hydrogen storage solid 78, or the configuration of the set of porous chambers 64, set of ports 68, number of components, or form and amount of water or steams introduced into the interior 58 of the sleeve 48 can be selectively configured to meet a set of predetermined criteria. For example, the set of predetermined criteria, can include but are not limited to, a target amount of total hydrogen gases liberated, a target amount of hydrogen gases liberated per a period of time (e.g. a flow rate of 1 kg of hydrogen per hour, etc.), a target time to release the hydrogen gases as soon as possible (e.g. the fastest chemical reaction), a target time to release the hydrogen gases as slowly as possible (e.g. the slowest chemical reaction), or a target pressure in the pressure-sealed sleeve 48 (e.g. maintain the pressure between 6 bar and 15 bar).

In a second example embodiment, heat can be supplied via the inlet 52 and through a hollow cavity of the shaft 60, or in a shaft 60 having a solid and thermally conductive configuration, wherein heat is released into the interior 58 of the pressure-sealed sleeve 48 by way of thermal conduction. The heat can then permeate the set of porous chambers 64, wherein the heat can initiate a chemical reaction of the hydrogen storage solid 78. For instance, in embodiments wherein the hydrogen storage solid 78 is lithium hydride and lithium hydroxide, the chemical reaction releases hydrogen gas and a by-product of lithium oxide, as follows:

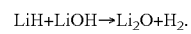

$$\mathrm{LiH} + \mathrm{LiOH} \rightarrow \mathrm{Li_2O} + \mathrm{H_2}.$$

The hydrogen gases can be delivered to the fuel cell 26, as explained above.

The above chemical reaction is also exothermic, despite needing heat to initiate the reaction, and the release of heat from the ongoing chemical reaction can generate an environment in the pressure-sealed sleeve 48 wherein the chemical reaction is self-sustaining. Just as in the first embodiment explained above, various aspects and components of embodiments of the disclosure can be selectively configured to meet a set of predetermined criteria.

Yet another example embodiment of the hydrogen storage unit 47, a hybrid of the two chemical reactions explained above can occur. For example, a first subset of the porous chambers 64 can include lithium hydride as the hydrogen storage solid 78, and a second subset of the porous chambers 64 can include lithium hydroxide and lithium hydride as the hydrogen storage solids 78. In this example embodiment, the lithium hydride of the first subset of the porous chambers 64 can chemically react with water or steam to generate hydrogen gases and heat with lithium hydroxide as a by-product, as explained above. For instance, the sleeve 48 can be oriented to limit, by gravity, the water level, water access, or the like, to only the first subset of the porous chambers 64 such that the first reaction can occur in a first portion of the sleeve 48.

The heat generated by the exothermic first reaction can then be transferred to a second portion of the sleeve 48 having the second subset of the porous chambers 64 to initiate the chemical reaction in the second subset of porous chambers 64 in the chemical reaction explained above. In this hybrid configuration the second subset of the porous chambers 64 can alternatively only include lithium hydride as the hydrogen storage solid 78, and the lithium hydroxide can be supplied as a product from the first chemical reaction. Thus, the hybrid configuration can be configured to require both the application of heat and water to operate both reactions, leading to two independent mechanisms to control the reactions or to initiate both.

Embodiments of the chemical reactions described herein are non-reversible. In this sense, once the chemical reactions described above have completed, they cannot be "recharged" to restore the hydrogen gases in the hydrogen storage solids 78. Thus, embodiments of the disclosure are envisioned wherein the hydrogen storage units 47 are removably installed in the hydrogen storage system 36, such that spent (e.g. previously reacted) hydrogen storage units 47 can be replaced during maintenance operations. The spent hydrogen storage units 47 can be, for example, returned for refurbishment or refilling with new or unspent hydrogen storage solid 78. Alternatively, embodiments of the disclosure can include hydrogen storage solids 78 or hydrogen storage units 47 configured to include rechargeable or chemically-reversible hydrogen storage solids 78.

The controller module 37 of the hydrogen storage system 36 can be configured to control the operation of the storage system 36 or the operation of the set of hydrogen storage units 47, to release hydrogen gases stored in the hydrogen storage solid 78. The controller module 37 can control these operations based on, for example, receiving a demand signal indicative of a demand for hydrogen gases. The demand signal can originate from an aircraft system indicating a supplemental amount of electrical power is requested to be generated by the fuel cell system 24 (and thus the need for hydrogen gases), or that the aircraft 10 requires power from the emergency power source 16 during emergency operations. In such an example, the controller module 37, in response to receiving the demand signal, can control the initiation of the aforementioned chemical reactions in a subset of hydrogen storage units 47, by selectively supplying at least one of water, steam, or heat to the subset of hydrogen storage units 47. The resulting chemical reactions can then liberate the hydrogen gases from the hydrogen storage solids 78, as explained herein.

The initiation of the chemical reactions in the subset of hydrogen storage units 47 can occur by way of selectively enabling access or transmission pathways for the water, steam, or heat, as needed. In this sense, the controller module 37 can be controllably coupled with, for example, a water source providing water or steam, or a set of valves controlling water or steam access to a selective subset of hydrogen storage units 47 having lithium hydride-based hydrogen storage solids 78. In another example, the controller module 37 can be controllably coupled with a heat source to controllably deliver heat to a selective subset of hydrogen storage units 47 in the storage system 36 having lithium hydroxide-based hydrogen storage solids 78.

Additionally, embodiments of the demand signal can include a signal that provides a binary indication of a demand for hydrogen gases, and the controller module 37 can operate a portion of a computer program having an executable instruction set for controlling the liberation of the hydrogen gases from the hydrogen storage units 47 according to a predetermined profile, predetermined design, or operational characteristic, as described above. The fuel cell 26 can then generate electricity from the liberated hydrogen gases.

The computer program having an executable instruction set can be included as part of, or accessible by, the controller module 37 in a machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, and the like, that have the technical effect of performing particular tasks or implement particular abstract data types. Machine-executable instructions, associated data structures, and programs represent examples of program code for executing the exchange of information as disclosed herein.

Alternatively, embodiments of the demand signal are envisioned wherein the demand signal can further include a quantitative element of the demand for hydrogen gases, for instance, a high demand, a medium demand, or a low demand. The quantitative element of the demand for hydrogen gases can be further related to, for example, different operating profiles for supplemental power (e.g. a small amount of supplemental power versus a large amount of supplemental power). The quantitative element of the demand for hydrogen gases can have the technical effect of operating different computer programs, or modifying the execution of the computer programs to adjust for the particular demand.

The controller module 37 can also operate by, for example, controllably staggering the initiating of the chemical reactions in respective hydrogen storage units 47 based on the predetermined profile, predetermined design, or operational characteristics of the fuel cell system 24, as explained above. Many other possible embodiments and configurations in addition to that shown in the above figures are contemplated by the present disclosure. Additionally, the design and placement of the various components can be rearranged such that a number of different in-line configurations could be realized.

The embodiments disclosed herein provide a method and apparatus for releasing hydrogen gas from a hydrogen storage solid. The technical effect is that the above described embodiments enable the controlled liberation of the hydrogen gases in accordance with design considerations and operational characteristics described herein. One advantage that can be realized in the above embodiments is that the above-described embodiments have superior hydrogen storage capabilities without the safety concerns of storing gaseous hydrogen at high pressures. The solid-state storage of the hydrogen minimalizes the potential energy of the hydrogen storage system, eliminates the danger hydrogen gas leaks at high pressure storage, and ensures the longevity of the hydrogen being stored. Longevity of the hydrogen being stored leads to fewer maintenance operations to maintain the overall system.

Additionally, because the above-described embodiments of the disclosure operate at low pressures, no high pressure hydrogen infrastructure is required, reducing manufacturing and certification costs. Thus, the capabilities of hydrogen gases on demand provide for safer handling, lower pressure systems, and multiple methods of controlling the chemical reactions, ensuring the low pressure environment.

Another advantage of the above-described embodiments is that the individualized hydrogen storage units, along with selective control of each unit, result in a hydrogen storage system that can be scaled to for the amount of hydrogen gases supplied, providing efficiencies of size and weight to suit the need. Additionally, the hydrogen storage solids described herein have a high hydrogen storage capacity, providing a high weight of stored hydrogen, and a lower overall system weight. In yet another advantage, non-reversible or non-rechargeable hydrogen storage solids can be individually replaced, as described herein. When designing aircraft components, important factors to address are size, weight, and reliability. The above described hydrogen storage system results in a lower weight, smaller sized, increased performance, and increased reliability system. The stable storage of hydrogen in a solid state reduces maintenance needs and will lead to a lower product costs and lower operating costs. Reduced weight and size correlate to competitive advantages during flight.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A solid hydrogen storage system, comprising:
   a pressure-sealed sleeve defining an interior and having an outlet;
   a hollow shaft fluidly coupled with a water reservoir and extending through the interior of the pressure-sealed sleeve, the shaft further including a set of ports configured to deliver water received from the water reservoir to the interior of the pressure-sealed sleeve;
   a set of porous chambers arranged axially along and concentric to the shaft and wherein at least one of the set of porous chambers includes a porous basket and a porous lid; and
   a hydrogen storage solid held by the at least one of the set of porous chambers and wherein hydrogen gas liberated from the hydrogen storage solid due to a chemical reaction flows from the at least one of the set of porous chambers and is supplied to the outlet.

2. The solid hydrogen storage system of claim 1 wherein at least one of the porous basket or the porous lid is movable in an axial direction relative to the shaft.

3. The solid hydrogen storage system of claim 2, wherein at least one of the porous basket or the porous lid are keyed to couple in one or more known or expected orientations.

4. The solid hydrogen storage system of claim 1, wherein the porous basket and the porous lid couple to allow for expected deformation of at least one of the porous basket or the porous lid.

5. The solid hydrogen storage system of claim 1, wherein the set of porous chambers includes at least a first porous chamber having a first porous lid and a first porous basket and a second porous chamber having a second porous lid and a second porous basket, wherein the first porous basket of the first porous chamber couples to the second porous lid of the second porous chamber.

6. The solid hydrogen storage system of claim 1, wherein the at least one of the set of porous chambers are at least one of water-permeable or steam-permeable.

7. The solid hydrogen storage system of claim 1, wherein the hydrogen storage solid is at least one of a metal hydride, lithium hydride, or lithium hydroxide.

8. The solid hydrogen storage system of claim 1, wherein the shaft further comprises a set of shaft segments configured to axially couple with adjacent shaft segments, and a shaft segment includes the porous basket and the porous lid.

9. The solid hydrogen storage system of claim 8, wherein the set of porous chambers comprises the porous lid of a first shaft segment and the porous basket of a second adjacent shaft segment.

10. The solid hydrogen storage system of claim 1, wherein the hydrogen storage solid is a powder.

11. The solid hydrogen storage system of claim 1, wherein the chemical reaction is non-reversible.

12. The solid hydrogen storage system of claim 1, wherein at least a portion of the at least one of the set of porous chambers is moveable relative to the shaft.

13. The solid hydrogen storage system of claim 1, wherein the outlet is fluidly coupled with a fuel cell.

14. The solid hydrogen storage system of claim 13, wherein the fuel cell is operably coupled to an aircraft.

15. The solid hydrogen storage system of claim 1, wherein the pressure-sealed sleeve is configured for exposure to pressure up to 15 bar.

16. The solid hydrogen storage system of claim 1, wherein the at least one of the set of porous chambers are configured to deform in response to an expansion of the hydrogen storage solid due to the chemical reaction.

17. A method of releasing the hydrogen gas from the solid hydrogen storage system of claim 1, the method comprising:
   receiving, by a control module, a demand signal indicative of a demand for hydrogen gas; and
   in response to receiving the demand signal, controlling, by the control module, the initiation of the chemical reaction in at least a portion of pressure-sealed sleeve having the at least one of the set of porous chambers defined by the porous lid and the porous basket that hold the hydrogen storage solid, by selectively supplying at least one of water or heat to the at least a portion of pressure-sealed sleeves, wherein the chemical reaction liberates the hydrogen gas from the hydrogen storage solid, and wherein the liberated hydrogen gas is proportional to the demand for hydrogen gas.

18. The method of claim 17, wherein the controlling further includes staggering the initiating of the chemical reaction in the at least a portion of pressure-sealed sleeves to maintain the pressure of the hydrogen gas between 6 bar and 15 bar.

19. The method of claim 17, wherein the receiving the demand signal is further indicative of an emergency power demand in an aircraft.

\* \* \* \* \*